(12) United States Patent
Huet et al.

(10) Patent No.: US 7,108,298 B2
(45) Date of Patent: Sep. 19, 2006

(54) LOCKING DEVICE OPERATED BY TWO PUSHES

(75) Inventors: Laurent Huet, Meru (FR); Christian Courtin, Vaureal (FR); Rachid Idjakiren, Beauchamp (FR)

(73) Assignee: ITW de France, Beauchamp (FR)

( * ) Notice: Subject to any disclaimer, the term of this patent is extended or adjusted under 35 U.S.C. 154(b) by 0 days.

(21) Appl. No.: 10/785,089

(22) Filed: Feb. 25, 2004

(65) Prior Publication Data

US 2004/0187278 A1 Sep. 30, 2004

(30) Foreign Application Priority Data

Mar. 24, 2003 (FR) .................................. 03 03551

(51) Int. Cl.
*E05C 19/02* (2006.01)
(52) U.S. Cl. ...................... 292/6; 292/DIG. 4; 292/19; 292/341.15
(58) Field of Classification Search ............... 292/6, 292/19–20, 45, 68, 153, 180, DIG. 4, 341.15
See application file for complete search history.

(56) References Cited

U.S. PATENT DOCUMENTS 4,657,291 A * 4/1987 Kurosaki ...................... 292/6
4,709,949 A * 12/1987 Umezawa et al. ............. 292/6
4,779,906 A * 10/1988 Kurosaki ...................... 292/19
4,792,165 A   12/1988 Nishimura
5,217,262 A * 6/1993 Kurosaki ...................... 292/6
5,273,328 A * 12/1993 Kurosaki ................. 292/336.3
5,292,158 A * 3/1994 Kurosaki ...................... 292/45
5,401,067 A * 3/1995 Kurosaki et al. ............. 292/63
5,984,381 A * 11/1999 Yamagishi .................... 292/45
5,997,056 A * 12/1999 Yamagishi ..................... 292/6

FOREIGN PATENT DOCUMENTS

FR    2 568 617    2/1986
FR    2 622 244    4/1989

* cited by examiner

*Primary Examiner*—Brian E. Glessner
*Assistant Examiner*—Christopher J. Boswell
(74) *Attorney, Agent, or Firm*—Lowe Hauptman & Berner, LLP

(57) ABSTRACT

A locking device for a cover and the like which is locked by a first push and unlocked by a second push includes a case (1) which has at a work face (8), an elastic leg (7) provided with a follower (14); and a sliding member (2) which has, parallel to the work face (8), a planar cam surface (24) from which projects a central island (27) about which is formed a cam track for the follower (14). On the first push, the follower (14) passes from its free position (R) to its captive position (V) by a first path on the cam track and, on the second push, the follower (14) passes from its captive position (V) to its free position (R) by a second path distinct from the first path.

10 Claims, 6 Drawing Sheets

LOCKING DEVICE OPERATED BY TWO PUSHES

FIELD OF THE INVENTION

The invention relates to the field of locking devices adapted to lock a door, cover or the like, when closed, to a fixed part.

More particularly, the invention concerns a locking device which is locked by a first push and unlocked by a second push.

BACKGROUND OF THE INVENTION

This type of locking device enables opening and closing, for example of a cover, without having to provide a knob or any other device on the cover for grasping.

To that end the cover is provided with a projecting tooth to cooperate with the locking device, closing being achieved by pushing the cover against the locking device, the latter retaining the projecting tooth; and opening being achieved by exerting a second push on the cover, this second push leading the locking device to release the projecting tooth.

Such locking devices are known, in particular from the document FR 2 585 757. This document describes an assembly formed from a case, a sliding member, a spring and a rocking striker. A rotatably mounted cam is furthermore provided on the sliding member so as to cooperate with the case to enable the locking device to prevent movement of a part, joined to the cover that is to be locked, between the sliding member and the striker.

Document FR 2 622 244 also describes a locking device comprising a case, a sliding member, a spring and a cam comprising an arm pivotably mounted on the case.

A further document FR 2 568 617 also describes such a locking device which comprises a case, a sliding member, a spring and a movable part termed cam plate.

These devices of the prior art are satisfactory in terms of their function of locking and unlocking.

SUMMARY OF THE INVENTION

The object of the invention is nevertheless to improve the prior art by providing a locking device of the kind described above and which is both simpler, more robust and cheaper to make.

To that end, the invention relates to a locking device for a cover and the like which is locked by a first push and unlocked by a second push, comprising:

a case open at one of its ends;

a sliding member engaged in said case and moveable with respect to it in a sliding direction (C), comprising a body and two opposed elastic claws which, when not urged, are maintained apart from each other, with, in a locked position, the sliding member inserted in the case, two opposed faces of the latter holding the two claws brought towards each other, and in a release position, the body of the sliding member being substantially flush with the opening of the case, freeing the claws;

a spring arranged between the body of the sliding member and the case, urging the sliding member towards the release position;

the device being characterized in that:

the case comprises a work face provided with an elastic leg moveable in the plane of said face, the elastic leg being provided with a follower projecting towards the inside of the case;

the sliding member comprises, parallel to said work face, a planar cam surface from which projects, towards the work face, a central island about which is formed a cam track for the follower, the follower, with respect to the island, being in a captive position when the device is in its locked position while in a free position when the device is in the release position;

with, on the first push, the follower passing from its free position to its captive position by a first path on the cam track and, on the second push, the follower passing from its captive position to its free position by a second path distinct from the first path.

The locking device in accordance with the preceding paragraphs is formed from only three parts: a case, a sliding member and a spring. Recourse to an additional part, hinged to the case or the sliding member and having the role of a cam, is not necessary. The consequence of this is to make the locking device not only simpler and cheaper to produce, but also more effective since the reduction of the number of moving parts in the device reduces the chances of inadvertent jamming of the mechanism and gives it a longer life in terms of locking/unlocking cycles.

The role played by the additional part in the prior art is here played by the follower and by the elastic leg which carries it.

According to a preferred feature, the elastic leg comprises, on its face on the opposite side from the follower, a planar contact surface adapted to cooperate with a wall provided to be held against the work face.

For example, for putting it in place and fixing it, the case may be inserted in a rectangular opening formed in a wall, for example a sheet of metal. One of the edges of this opening then forms a straight ruler arranged against the work face of the case, preventing the elastic leg from bending outwardly of the case, and thereby constraining it to remain in the plane of the work face.

When the elastic leg is set in lateral movement, within the plane of the work surface, this contact surface provides sliding guidance for the elastic leg against said edge of the opening.

The outer environment is thus able to be exploited in order to hold the elastic leg within the desired plane.

Preferably, in particular to ensure that said contact surface cooperates with the wall in which the locking device is inserted, the case comprises, on each of its lateral faces adjacent to the work face, at least one fixing lug opposite a stop surface transverse to the direction of sliding, and the contact surface may extend beyond the ends of the fixing lugs towards the opening.

According to one embodiment, the elastic leg comprises two branches each attached to a corner of the work face, the two branches joining together at the follower.

This attachment of the elastic leg to the case enables lateral movement, in the plane of the work surface, in accordance with what is required for the operation of the locking device.

This attachment furthermore enables twisting of the elastic leg. This property enables the projecting follower of the elastic leg to be oriented, at rest, perpendicularly to the work surface, whereas, when the elastic leg is urged, the follower may be inclined with respect to the perpendicular to the work surface.

According to a preferred feature, the follower has a lateral flat.

This feature is adapted to render the follower thinner when viewed from the side at a certain angle. It is angularly positioned on the follower to facilitate the passage of the latter along the cam track.

Furthermore, said cam track may be defined by two lateral walls substantially parallel to the direction of sliding, as well as by a peninsula facing the central island, situated at the connection of the elastic claws to the sliding member, said lateral walls and said peninsula projecting from the cam surface towards the work face.

According to a preferred feature, said central island comprises a first edge, parallel to the direction of sliding, a second edge starting from one end of the first edge and oriented obliquely, these two edges furthermore being connected by a curved edge bowed towards the inside of the central island.

According to a another preferred feature, the peninsula comprises two edges forming a point directed towards the central island, one of these edges, situated on the same side as the second edge of the central island, being parallel to the direction of sliding and the other edge, situated on the same side as the first edge of the central island, being oblique.

These features permit optimal guidance of the follower on the cam track formed around the central island.

Furthermore, to avoid the follower returning on the cam track by a path which is only intended for the circulation of the follower in the opposite direction, the cam may comprise at least one portion of width just sufficient for the passage of said follower This portion participates in the formation of a chicane guaranteeing against the possibility of the follower making a complete locking/unlocking cycle all in one go.

The peninsula may comprise at least one stop edge arranged transversely to the direction of sliding and adapted to form an abutment for the follower.

This stop surface acts as an abutment to force the user to stop pressing on the cover to ensure locking.

According to one embodiment, the cam surface further comprises a non-return rib projecting from the cam surface towards the work face and arranged parallel to the direction of sliding, said non-return rib extending between the central island and the peninsula.

This non-return rib guarantees that, when the nipple crosses it during an unlocking cycle, the nipple cannot go back again, which ensures unlocking without the risk of returning to the locked position. The presence of this rib may advantageously be combined with the possibility of twisting, provided for above, of the elastic leg.

According to one embodiment, the case comprises a guide aperture on one of its sides perpendicular to the opening and the sliding member comprises a tooth engaged in said guide aperture.

Similarly, the case may comprise an engagement groove situated on the inner face of the side on which the guide aperture is formed, the engagement groove continuing on from the guide aperture to one end of the case, with less depth. Furthermore, said tooth may comprise a bevel.

These provisions facilitate the mounting of the sliding member in the case.

For optimal guidance of the sliding member in the case, even at the end of travel, the lateral walls may comprise a portion projecting beyond the opposite end of the sliding member from the claws and adapted to be inserted in an aperture formed in the opposite face of the case from the opening.

Concerning the fixing of the spring, the case may comprise a spring guide projecting from the opposite face of the case from the opening, and similarly the sliding member may comprise a hole for receiving the spring.

Holding in place of the spring is thus ensured so as to avoid any displacement of the spring which could give rise to the mechanism becoming jammed.

BRIEF DESCRIPTION OF THE DRAWINGS

Other features and advantages of the invention appear in the light of the following description of a preferred embodiment, given by way of non-limiting example, and made with reference to the accompanying drawings in which.

DETAILED DESCRIPTION OF THE PREFERRED EMBODIMENTS

Figure 1:
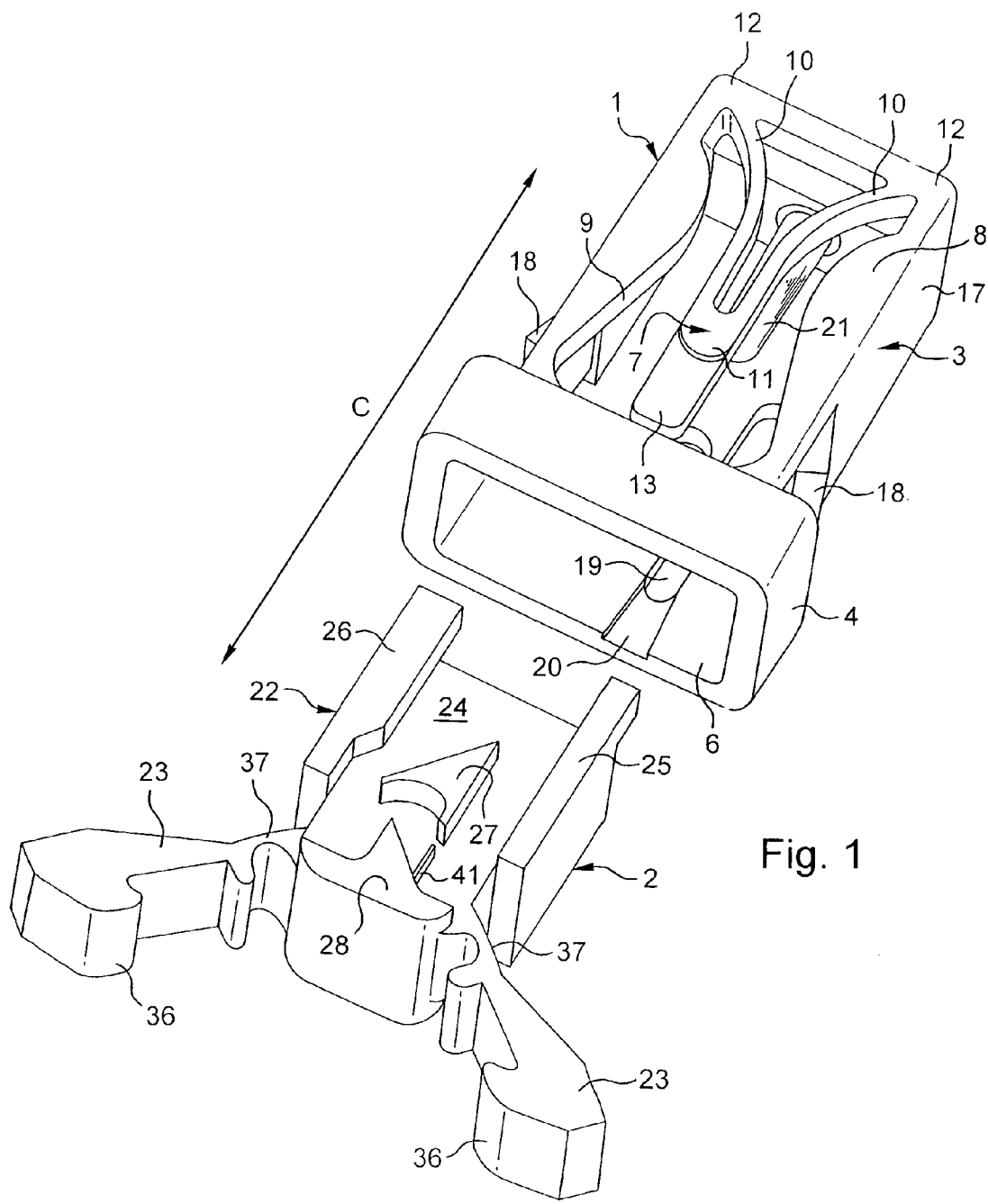
FIG. 1 is a perspective view showing the sliding member and the case of a locking device according to the invention, the spring not being shown.

FIG. 1 represents a case 1 and a sliding member 2 ready to be assembled to slide with respect to each other in a sliding direction C.

Figure 10:
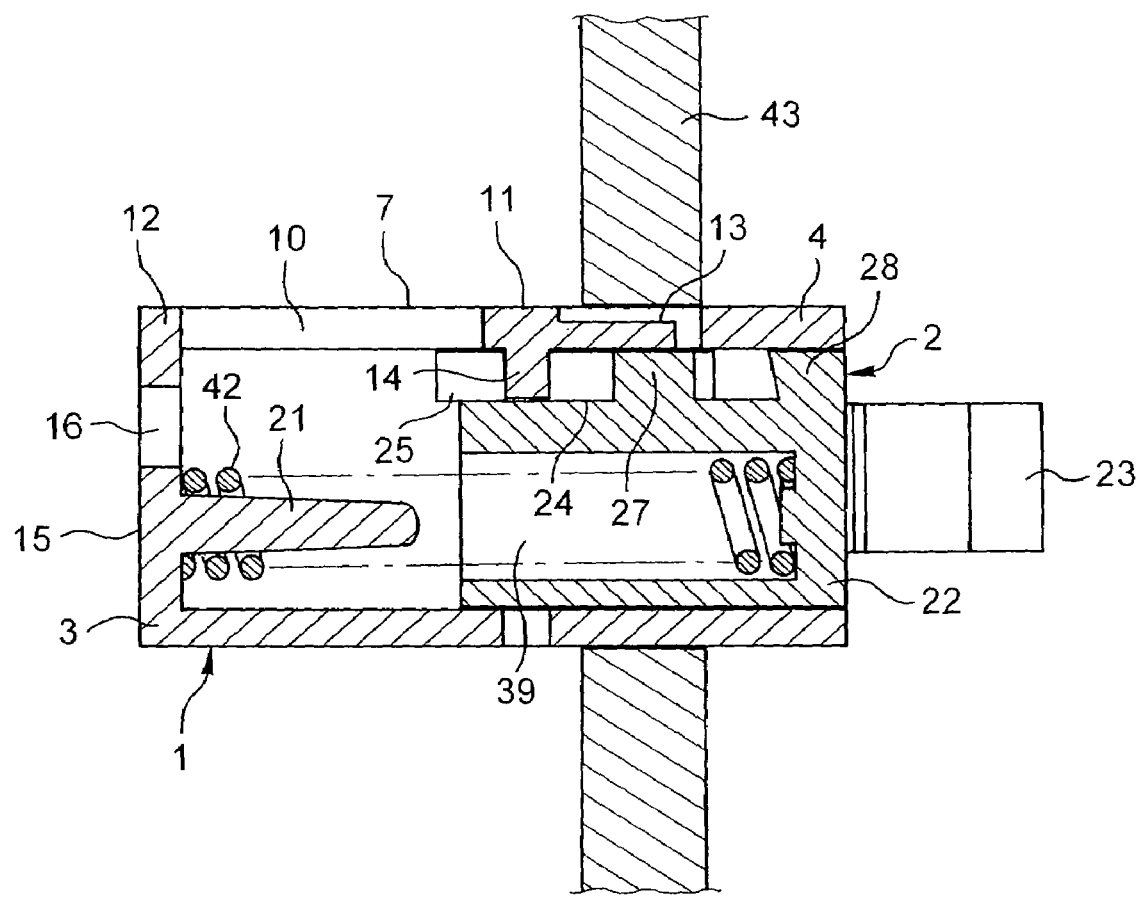
FIG. 10 is a longitudinal section view of the device according to the invention, in the assembled state, mounted on a wall.

A spring 42 (visible solely in FIG. 10) is furthermore adapted to be positioned between these two parts 1, 2 within the case 1. Once the spring has been put in position and the sliding member inserted into the case 1 (as shown in FIG. 10) this assembly forms a locking device according to the invention.

FIGS. 2 to 5 represent the case 2 alone from various viewing angles, so as to make the members constituting it visible.

Case 1 comprises both a hollow body 3 enclosed within a substantially parallelepiped form of which one of the faces is open, as well as a collar 4 extending the hollow body 3 beyond said open face.

The collar 4 is itself enclosed substantially within a parallelepiped form, open from one side to the other, such that the case 1 has an opening 6 at the end of the collar 4. Furthermore, the thickness E of the collar 4 is substantially equal to that of the hollow body 3 and the width L of the collar 4 is greater than that of the hollow body 3 (see FIG. 2).

Figure 3:
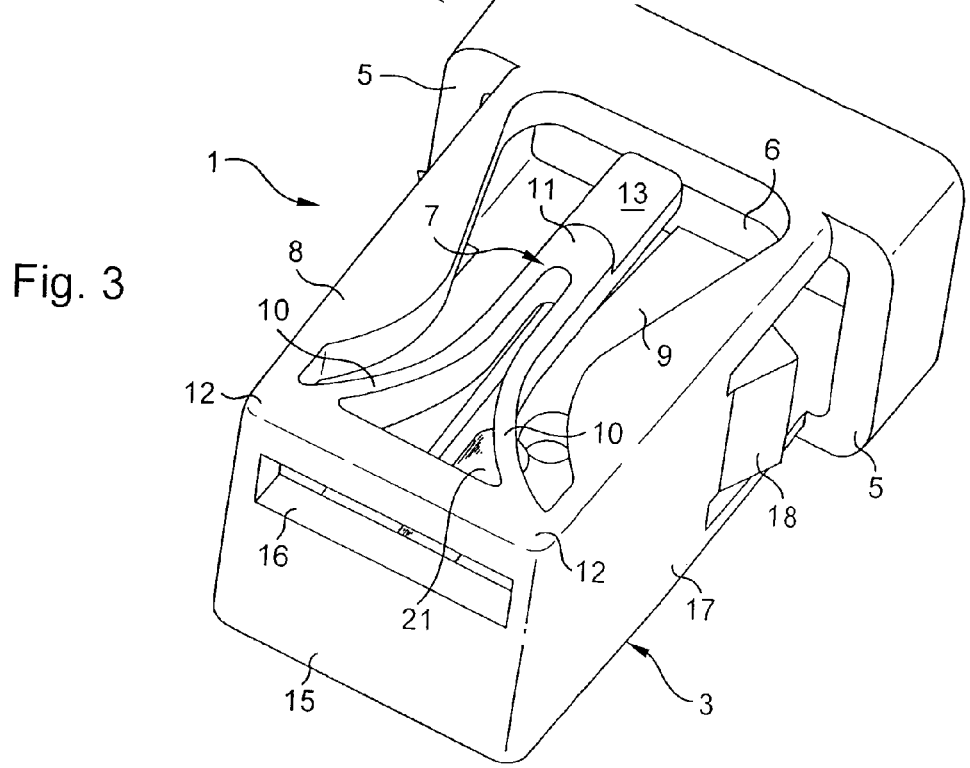

This arrangement of the collar 4 with respect to the hollow body 3 enables two lateral stop surfaces 5 to be formed, transverse to the direction of sliding C (see FIG. 3).

One of the faces 8 of the hollow body 3, adjacent to the opening 6, is termed "work face" and has a moveable elastic leg 7. To that end, the work face 8 is pierced by an opening 9 permitting the lateral displacement of the elastic leg 7 which is connected to the base of said face 8 by two elastic branches 10.

The elastic leg 7 is constituted, on the one hand by a head 11 which, by virtue of the provisions given earlier, is moveable in the plane of the work face 8, and on the other hand, by the two branches 10 which extend from the head 11, while diverging from each other so that each meets a corner 12 of the work face 8.

The branches 10 and the elastic leg 7 itself are arranged such that the head 11 is positioned on the work face 8, when no force is applied, along a medial position, parallel to the sliding direction (this resting position of the elastic leg 7 is that visible in FIGS. 2 to 5).

The elastic leg 7 also comprises, adjacent the head 11 and turned outwardly of the case 1, a planar contact surface 13 adapted to slide on a corresponding surface of the system in which the present locking device will be mounted, as set out further on.

Figure 4:
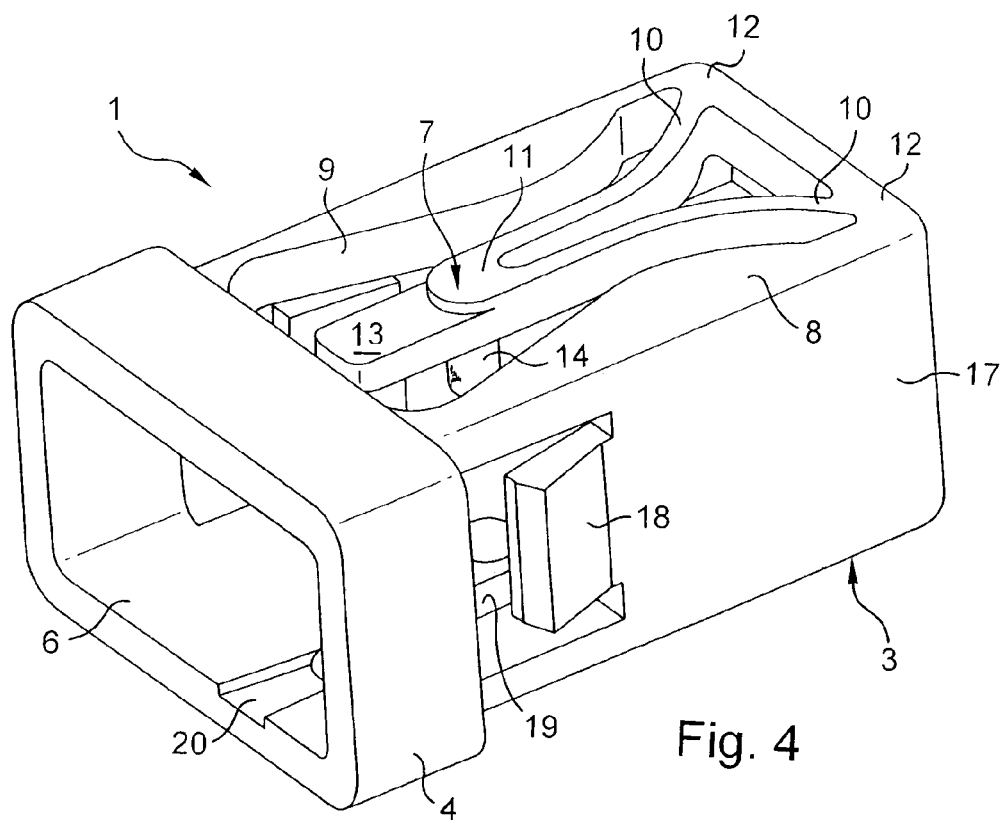
Figure 5:
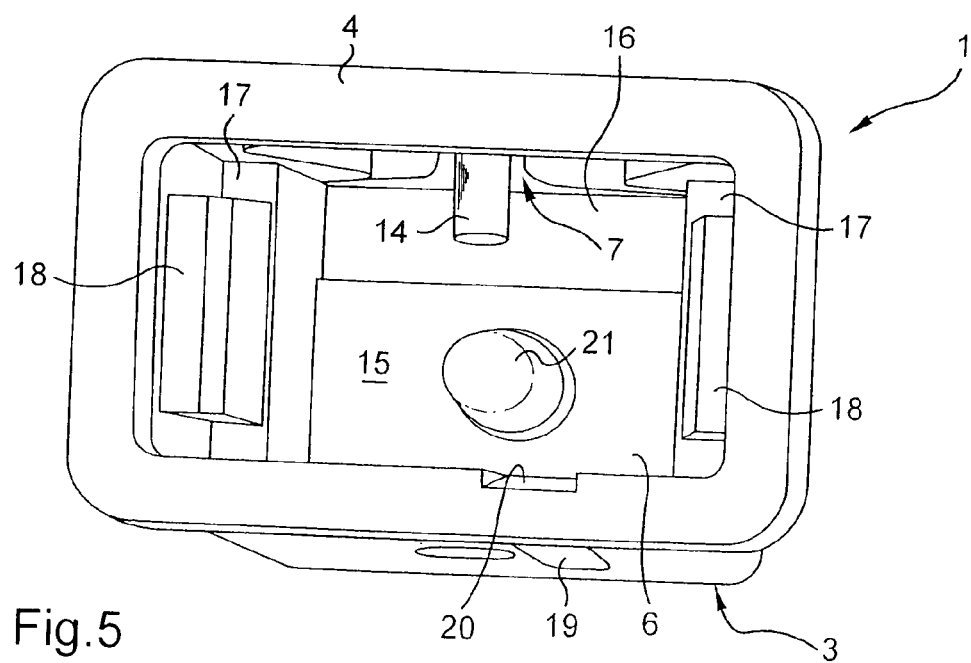
FIG. 5 is a perspective view showing the interior of the case of FIG. 1.

With reference to FIGS. 4 and 5, the elastic leg lastly comprises a follower 14 arranged on the head 11, on its face on the opposite side from the contact surface 13, projecting inwardly of the case 1.

The hollow body 3 of the case 1 further comprises, on the face 15 hereinafter termed "back face", opposite from the opening 6, a rectangular aperture 16 (FIGS. 3 and 5).

On its faces 17 hereinafter referred to as "lateral faces", those contiguous with the work face 8 and with the back face 15, the hollow body 3 comprises two fixing lugs 18 (FIGS. 3 and 4), numbering one lug 18 per lateral face 17, these lugs 18 being each opposite a stop surface 5 of the collar 4.

Each fixing lug 18 is adapted to cooperate with a stop surface 5 in order for them to grip between them the thickness of a plate on which the locking device is to be mounted.

Figure 2:
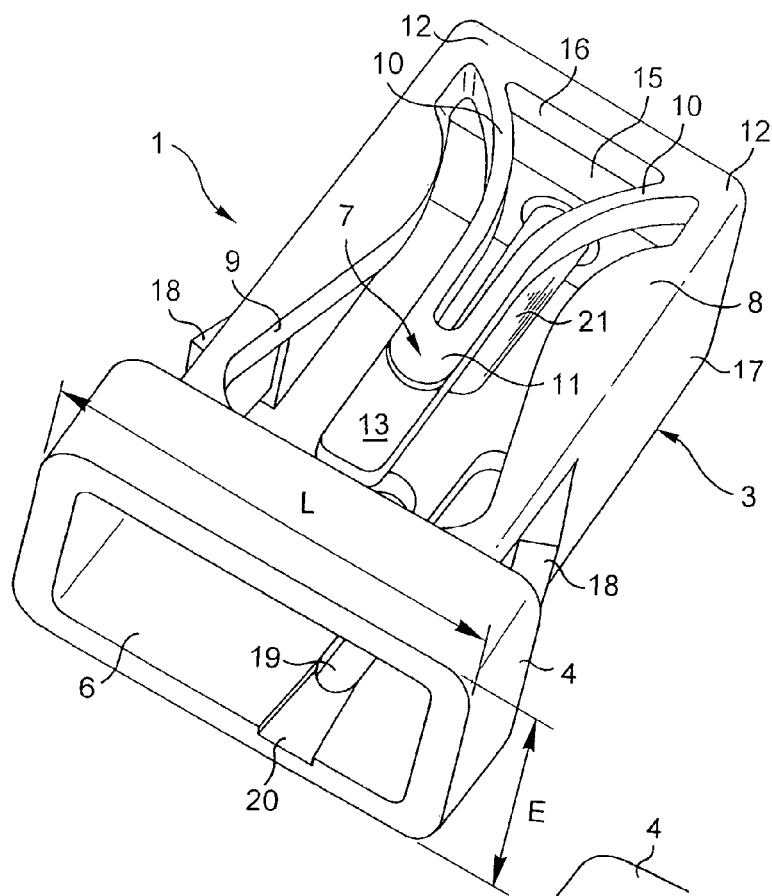
FIGS. 2, 3 and 4 are perspective views showing the casing of FIG. 1, the views being respectively onto the opening, onto the opposite face from the opening, and lateral.

As shown in FIGS. 2, 4, and 5, the hollow body 3 comprises, on its face opposite from the work face 8, an oblong guide aperture 19, passing all the way through and oriented longitudinally in the sending direction C.

Continuing on from the guide aperture 19, on the inner face of the collar 4, is an engagement groove 20 extending to the opening 6 of the case 1.

On FIGS. 2, 3 and 5 there is also visible a finger forming a spring guide 21, this finger projecting inwardly of the case 1 from the inner surface of the back face 15.

Figure 6:
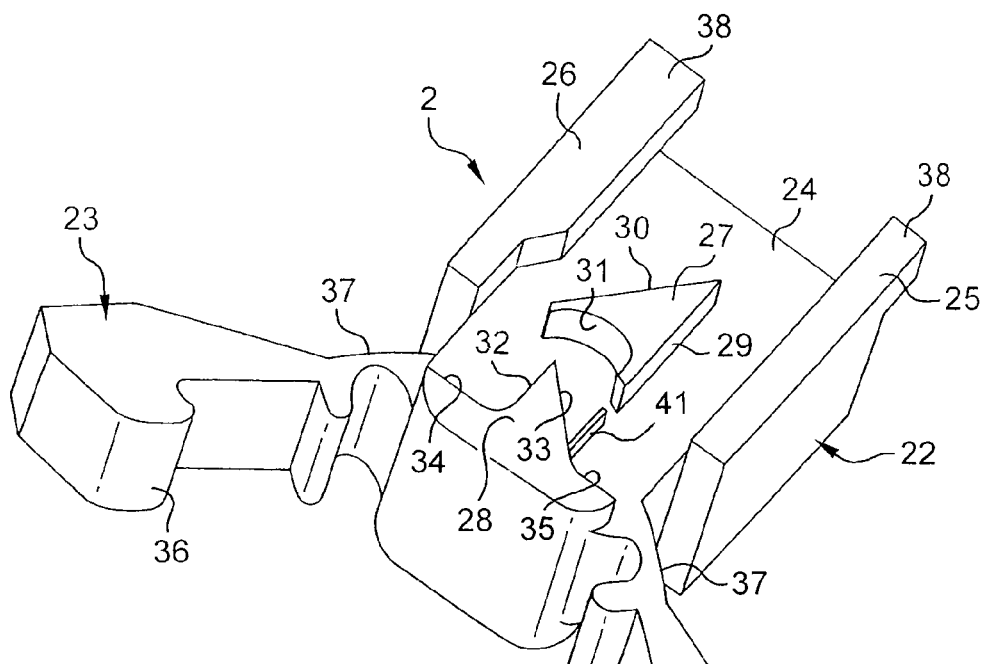
FIGS. 6 and 7 are perspective views showing the sliding member of FIG. 1, the views respectively being from the elastic claws end and from the body end.
Figure 7:
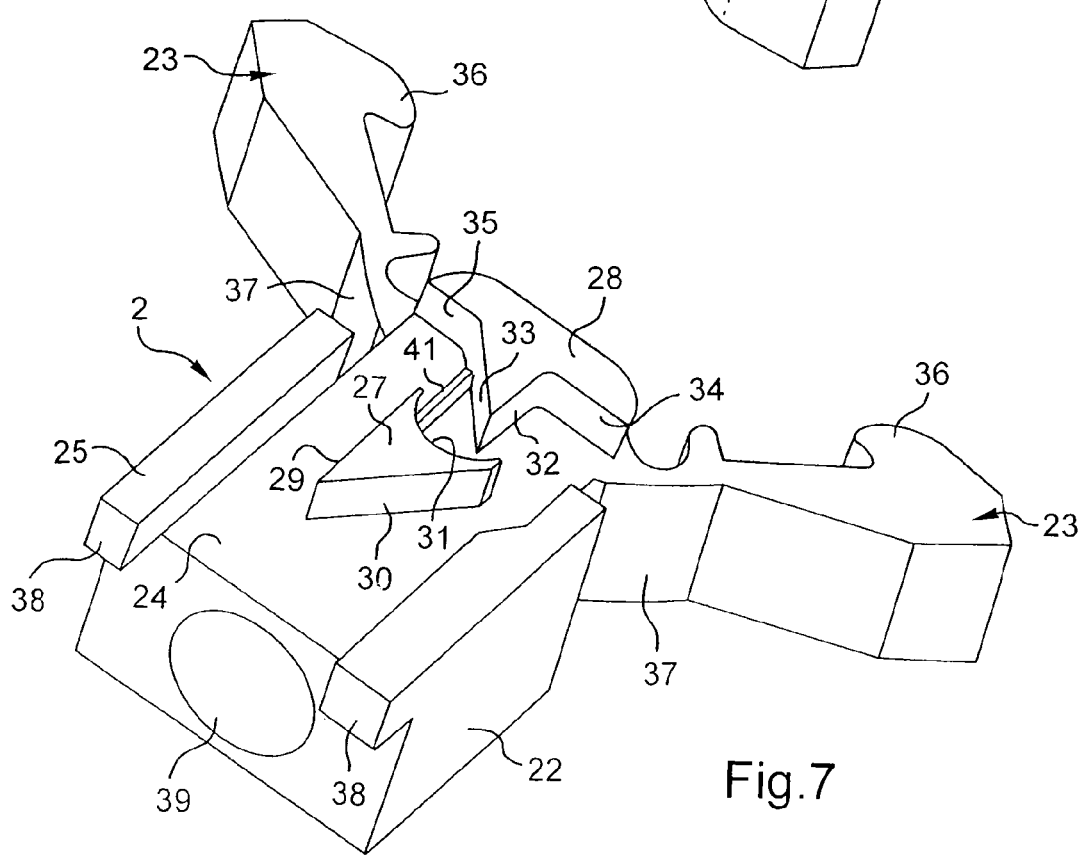
Figure 8:
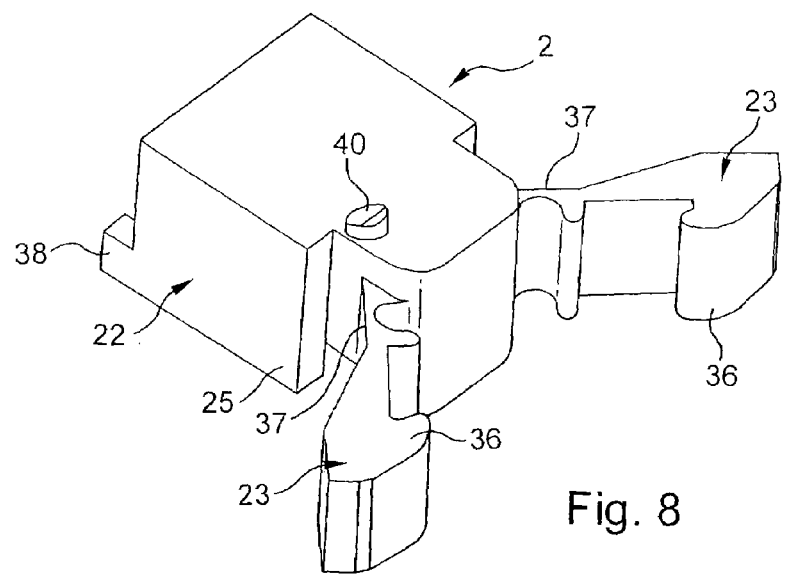
FIG. 8 is a perspective view showing the sliding member of FIG. 1, in a position turned over with respect to FIG. 6.

FIGS. 6 to 8 represent the sliding member 2 alone. This comprises a body 22 on which two claws 23 are elastically attached. These claws 23 are mobile between two extreme positions: an open position in which the two claws 23 are separated from each other, as represented in FIGS. 1 and 6 to 8, and a closed position in which the two claws 23 are brought towards each other (this position is partially represented in FIG. 9).

The claws 23 are furthermore each provided with a boss 36, the two bosses 36 facing each other when the claws 23 are in the closed position.

It will be noted that the claws 23 are designed to assume their closed position when the slide 2 is inserted in the case 1, in particular by virtue of the lateral surfaces 37 bearing against the lateral faces 17 of the case.

With reference to FIGS. 6 and 7, the body 22 is a solid part having on one of its faces a planar surface 24 hereinafter referred to as a "cam surface", oriented towards the work face 8 of the case 1 when the latter and the sliding member 2 are assembled.

The disposition of this cam surface 24, as well as the forms of the case 1 and of the sliding member 2, are adapted such that, when the sliding member 2 is engaged in the case 1, the follower 14 of the elastic leg 7 arrives next to the cam surface 24, without necessarily touching it.

Furthermore, two projections 25, 26 hereinafter termed "lateral walls" situated on respective sides of the cam surface 24, emerge parallel to the cam surface 24. These lateral walls 25, 26 form guide surfaces enabling the follower 14 to be moved over the whole of the cam surface 24 without the risk of departing laterally from it.

The lateral walls 25, 26 also each comprise a portion 38 projecting beyond the cam surface 24, at the opposite end to the claws 23.

These portions 38 are adapted to fit into the aperture 16 of the case 1 when the sliding member 2 is completely inserted into the case 1.

Furthermore, the cam surface 24 also comprises projections in the form of a central island 27 and a peninsula 28.

The central island 27 projects perpendicularly to the cam surface 24, between the lateral walls 25, 26 and substantially half-way up the cam surface 24. Its section is that of a triangle of which one of the sides is replaced by a curve bowed towards the inside of the triangle.

The central island 27 is of thickness substantially equal to the thickness of the side walls 25, 26, these thicknesses being measured from the cam surface 24 and normal to it.

The central island 27 thus has three side edges 29, 30, 31, i.e. a first edge hereinafter termed "vertical edge" 29 arranged parallel to the sliding direction C, a second edge hereinafter termed "oblique edge" 30 extending in the direction of one 26 of the lateral walls, substantially along a diagonal of the cam surface 24, and a third edge hereinafter termed "curved edge" 31.

This curved edge 31 has a recessed form enabling it to receive the follower 14, as set out further on.

The peninsula 28 is arranged on one of the edges of the cam surface 24, between the hinging points of the claws 23 of the sliding member 2. Its thickness is substantially equal to that of the central island 27 and of the lateral walls 25, 26. It comprises a point directed towards the curved edge 31 of the central island 27.

A first edge of the peninsula 28 hereinafter termed "vertical edge" 32 is parallel to the direction of sliding C and is separated from the vertical edge 29 of the central island 27 by a distance, measured normal to the sliding direction C, at least equal to the diameter of the follower 14.

A second edge 33 of the peninsula 28 forms, with the vertical edge 32, the aforementioned point. This edge, hereinafter termed "oblique edge" 33, is connected to the end of the vertical edge 32 and is arranged obliquely in a direction substantially perpendicular to the direction in which the oblique edge 30 of the central island 27 extends and in the opposite direction to the central island 27.

The peninsula 28 further comprises, on respective sides of the point formed by the edges 32, 33, two stop edges 34, 35 arranged transversely to the sliding direction C and adapted to form an abutment for the follower 14.

A stop edge 34 is adjacent to the vertical edge 32 of the peninsula 28, and the other stop edge 35 is adjacent to the oblique edge 33 of the peninsula 28.

The sliding member 2 further comprises a hole 39 for receiving the spring (see FIG. 7).

With reference to FIG. 8, the sliding member 2 also comprises a beveled tooth 40 adapted to cooperate with the guide aperture 19 of the case 1 such that the sliding of the sliding member 2 with respect to the case 1 is actually in the direction of sliding C and such that said tooth 40 acts as an abutment preventing the separation of the two parts 1, 2.

The locking device which has just been described operates in the manner indicated below.

This device is adapted to lock a cover or the like provided for that purpose with a tooth capable of being retained by the claws 23, here by virtue of the bosses 36, in the closed position (locking) or able to be released by the claws 23 in the open position (unlocking).

The locking device is adapted to be mounted on a fixed plate parallel to the cover when the latter is closed, the tooth of the cover projecting normal to the latter, towards the locking device and facing the latter.

FIG. 10 shows the locking device mounted on such a fixed plate 43. Mounting on the fixed plate 43 requires a rectangular opening in the latter dimensioned to enable the insertion of the hollow body 3 of the case 1 such that the stop surfaces 5 of the 4 collar bear on the face of said plate that is turned towards the cover and such that the fixing lugs 18 exert a force on the face on the other side of the plate.

The thickness of the plate 43 on the one hand and the distance between each stop surface 5 and the corresponding fixing lugs 18 on the other hand, are chosen to ensure optimal fixing of the locking device. The thickness of the plate 43 may for example be slightly greater than said distance.

Figure 9:
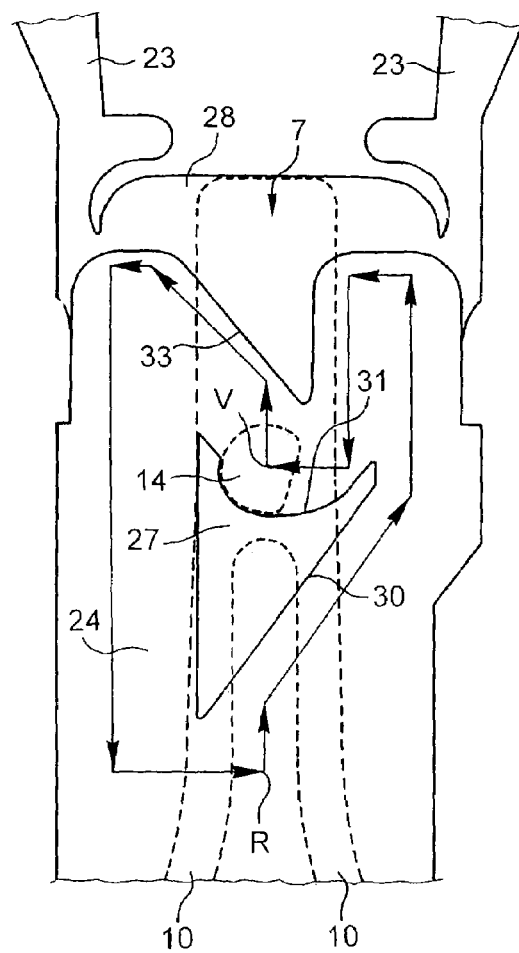
FIG. 9 is a partial perspective diagram showing the association of the case and the sliding member of FIG. 1, in locked position, and embodying the cam track.

With reference to FIG. 9, a locking/unlocking cycle will be described below.

When the locking device is in the release position, the follower 14 is in the position denoted R, here termed the "free position". In this position, the spring 42 holds the sliding member in abutment (the tooth 40 is in abutment with the aperture 19, adjacent the engagement groove 20) and the claws 23 are free to open to release the tooth of the cover (this position R is that of FIG. 10).

When the cover is closed, the tooth of the cover comes to bear against the body 22 of the sliding member 2, adjacent the peninsula 28, and maintenance of the pressure on the door leads to the sliding member 2 being pushed within the case 1 which is held by the fixed plate.

The follower 14 thus meets the oblique edge 30 of the central island 27 which imparts an oblique movement to it.

The elastic leg 7 accompanies the movement of the follower 14 by moving laterally.

The pushing on the cover still being continued, the follower 14 departs from the influence of the central island 27 and continues its path on the cam track by a rectilinear trajectory bringing it against the stop edge 34 of the peninsula 28.

At this stage, the mechanism is blocked and the user naturally stops pushing on the cover.

The follower 14 next returns to its central position (due to the elastic properties of the elastic leg 7) and, in parallel, the spring causes the sliding member 2 to rise with respect to the case 1 such that the sliding member becomes lodged against the curved edge 31 of the central island 27 (position V of FIG. 9, here termed "captive position").

In relation to this, FIG. 9 shows a follower 14 which has a lateral flat facilitating its passage from the stop edge 34 to the curved edge 31, avoiding the risks of the follower 14 returning to position R.

The cover is thus locked via its projecting tooth gripped by the bosses 36 of the claws 23.

To release the cover, the user applies a second push to the cover which, in the same manner as previously, imparts an oblique movement to the follower 14, this time along the oblique edge 33 of the peninsula 28 until the follower 14 comes into abutment against the stop edge 35 of the peninsula 28.

Again, the user stops pushing on the cover and the follower 14 performs a movement that is rectilinear (under the effect of the spring 42) as well as transverse (under the effect of the elastic leg 7) towards position R.

For said rectilinear trajectory to take place without the risk of the follower 14 returning to position V, an anti-return rib 41 is provided, visible in FIGS. 1, 6 and 7.

The members of the locking device are disposed so as to hold the follower 14 close to the cam surface 24 whatever its path along the cam track. Thus, the arrangement described of the stop surfaces 5 and the fixing lugs 18 of the case 1 mean that, when the case 1 is mounted on the fixed plate 43, an edge of the rectangular opening in which the case is housed comes into contact with the work face 8, passing normal to the contact surface 13 of the elastic leg 7 (see FIG. 10).

This edge acts as a straight ruler applied against the work face 8 and prevents the elastic leg 7 from leaving the plane of that face.

The contact surface 13 may be arranged to be spaced slightly back from said edge of the rectangular opening, in order to enable the elastic leg 7 to make a twisting movement enabling the follower 14 to be inclined during its displacement. This spacing may, for example in the present embodiment, be 0.2 mm.

Variant embodiments of the locking device may be envisaged without departing from the scope of the invention. For example the cam track may be defined uniquely by the central island 27, the functions here assumed by the peninsula 28 or the lateral walls 26 then being performed by suitable guidance of the elastic leg. Similarly, other means for enabling the elastic leg 7 to move may be provided, such as a transverse slide. Finally, the follower 14 may comprise any means enabling it to follow the cam track effectively, for example a roller.

The invention claimed is:

1. A locking device for a cover which is locked by a first push and unlocked by a second push, said device comprising:

a case open at one of ends thereof;

a sliding member engaged in said case and moveable with respect to said case in a sliding direction, said sliding member comprising a body and two opposed elastic claws which, when not urged, are maintained apart from each other, wherein said device has a locked position when the sliding member is inserted in the case with two opposed faces of the case holding the two claws brought towards each other, and a release position with the two opposed faces of the case freeing the claws;

a spring being arranged between the body of the sliding member and the case, and urging the sliding member towards the release position;

the case having a work face provided with an elastic leg moveable in the plane of said work face, the elastic leg being provided with a follower projecting towards an inside of the case;

the sliding member having, parallel to said work face, a planar cam surface from which projects, towards the work face, a central island about which is formed a cam track for the follower, wherein the follower, with respect to the island, is in a captive position when the device is in the locked position and in a free position when the device is in the release position; and on the first push, the follower passing from the free position to the captive position by a first path on the cam track and, on the second push, the follower passing from the captive position to the free position by a second path distinct from the first path;

wherein said follower, while traveling on the first and second paths, moves in the plane of said work face from one of the two opposed faces of the cases towards the other, and vice versa; and wherein said elastic leg comprises two branches each attached to a corner of the work face, the two branches joining together at the follower.

2. A locking device for a cover which is locked by a first push and unlocked by a second push, said device comprising:

a case open at one of ends thereof;

a sliding member engaged in said case and moveable with respect to said case in a sliding direction, said sliding member comprising a body and two opposed elastic claws which, when not urged, are maintained apart from each other, wherein said device has a locked position when the sliding member is inserted in the case with two opposed faces of the case holding the two claws brought towards each other, and a release position with the two opposed faces of the case freeing the claws;

a spring being arranged between the body of the sliding member and the case, and urging the sliding member towards the release position;

the case having a work face provided with an elastic leg moveable in the plane of said work face, the elastic leg being provided with a follower projecting towards an interior of the case;

the sliding member having, parallel to said work face, a planar cam surface from which projects, towards the work face, a central island about which is formed a cam track for the follower, wherein the follower, with respect to the island, is in a captive position when the device is in the locked position and in a free position when the device is in the release position; and on the first push, the follower passing from the free position to the captive position by a first path on the cam track and, on the second push, the follower passing from the captive position to the free position by a second path distinct from the first path;

wherein said follower, while traveling on the first and second paths, moves in the plane of said work face from one of the two opposed faces of the cases towards the other, and vice versa;

said leg and said follower are integral parts of said case; and said follower has a cross section which is taken in a plane parallel to the plane of the work face and comprises a straight side.

3. A locking assembly operable by first and second pushes, said assembly comprising:

a case open at one end and having an elastic leg deformable in a plane of a work face of said case, said elastic leg having a follower which projects toward an interior of said case and is moveable as the elastic leg deforms; and a sliding member operatively positioned and moveable in a sliding direction in said case, said sliding member operatively urged away from said case, said sliding member comprising:

a body having a cam surface facing the work face of said case, said cam surface having a central island projecting toward the work face and a cam track formed thereabout for the follower, the follower being in a captive position when the assembly is in a locked position and in a free position when the assembly is in a released position; and two opposed elastic claws which when not urged are maintained apart from each other, wherein said two claws are brought toward each other when the assembly is in the locked position and the sliding member is inserted in the case and wherein said two claws are released when the assembly is in the released position;

wherein the follower passes from the free position to the captive position by a first path on the cam track as a result of a first push, and the follower passes from the captive position to the free position by a second path distinct from the first path as a result of a second push; and wherein said follower, while traveling on the first and second paths, moves, in the plane of said work face and relative to said case, a distance greater than a maximum width of said central island as measured in a direction transverse to the sliding direction.

4. The locking assembly of claim 3, wherein said elastic leg further comprises two branches located in the plane of said work face and converging towards the follower from different portions of said work face.

5. The locking assembly of claim 4, wherein said branches converge towards the follower from corners of said work face, and said branches and a side of said work face located between said corners together define a generally triangular aperture opening into the interior of said case.

6. The locking assembly of claim 5, wherein each of said branches includes a first, curved section extending from the respective corner towards a center of said work face and a second section extending from the first curved section to the follower.

7. The locking assembly of claim 6, wherein said central island is an integral part of said body.

8. A locking device for a cover which is locked by a first push and unlocked by a second push, said device comprising:

a case open at one of ends thereof;

a sliding member engaged in said case and moveable with respect to said case in a sliding direction, said sliding member comprising a body and two opposed elastic claws which, when not urged, are maintained apart from each other, wherein said device has a locked position when the sliding member is inserted in the case with two opposed faces of the case holding the two claws brought towards each other, and a release position with the two opposed faces of the case freeing the claws;

a spring being arranged between the body of the sliding member and the case, and urging the sliding member towards the release position;

the case having a work face provided with an elastic leg moveable in the plane of said work face, the elastic leg being provided with a follower projecting towards an interior of the case;

the sliding member having, parallel to said work face, a planar cam surface from which projects, towards the work face, a central island about which is formed a cam track for the follower, wherein the follower, with respect to the island, is in a captive position when the device is in the locked position and in a free position when the device is in the release position; and on the first push, the follower passing from the free position to the captive position by a first path on the cam track and, on the second push, the follower passing from the captive position to the free position by a second path distinct from the first path;

wherein said follower, while traveling on the first and second paths, moves in the plane of said work face from one of the two opposed faces of the cases towards the other, and vice versa;

said leg and said follower are integral parts of said case;

said work face has, in the plane thereof, an aperture opening into the interior of said case and said elastic leg is moveable within said aperture; and said elastic leg comprises two branches located in the plane of said work face and converging towards the follower from different portions of a peripheral edge of said aperture.

9. The locking assembly of claim 8, wherein said branches converge towards the follower from corners of said aperture, and said branches and a side of said peripheral edge located between said corners together define three sides of an opening.

10. The locking assembly of claim 8, wherein each of said branches is deformable in the plane of said work face to move said elastic leg within said aperture.

* * * * *